US009866408B2

(12) United States Patent
Latham et al.

(10) Patent No.: US 9,866,408 B2
(45) Date of Patent: Jan. 9, 2018

(54) METHODS, SYSTEMS, AND COMPUTER READABLE MEDIA FOR CONFIGURING A FLOW INTERFACE ON A NETWORK ROUTING ELEMENT

(71) Applicant: Oracle International Corporation, Redwood Shores, CA (US)

(72) Inventors: Lee Latham, Plano, TX (US); Eamon O'Grady, Dublin (IE); Timothy Matt, Frisco, TX (US); David C. Campbell, Allen, TX (US)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 14/569,589

(22) Filed: Dec. 12, 2014

(65) Prior Publication Data
US 2016/0173329 A1 Jun. 16, 2016

(51) Int. Cl.
*H04L 12/46* (2006.01)
*H04L 12/24* (2006.01)
*H04L 12/801* (2013.01)
*H04L 12/721* (2013.01)

(52) U.S. Cl.
CPC ........ *H04L 12/4641* (2013.01); *H04L 12/467* (2013.01); *H04L 12/4675* (2013.01); *H04L 41/0806* (2013.01); *H04L 41/082* (2013.01); *H04L 45/38* (2013.01); *H04L 47/15* (2013.01)

(58) Field of Classification Search
CPC ......... H04L 12/4675; H04L 12/4641–12/4658
See application file for complete search history.

(56) References Cited

U.S. PATENT DOCUMENTS

| | | |
|---|---|---|
| 6,522,629 B1 | 2/2003 | Anderson, Sr. |
| 7,197,553 B2 | 3/2007 | Roberts et al. |
| 7,266,120 B2 | 9/2007 | Cheng et al. |
| 7,433,814 B2 | 10/2008 | Liu et al. |
| 7,483,395 B2 | 1/2009 | Iwanaga et al. |
| 7,525,969 B2 | 4/2009 | Grant |
| 7,555,420 B2 | 6/2009 | Wang et al. |
| 7,733,795 B2 | 6/2010 | Johnson et al. |

(Continued)

OTHER PUBLICATIONS

Commonly-assigned, co-pending U.S. Patent Application for "Methods, Systems, and Computer Readable Media for Configuring Service Networks," (Unpublished, filed Dec. 12, 2014).

(Continued)

*Primary Examiner* — Omer S Mian
(74) *Attorney, Agent, or Firm* — Jenkins, Wilson, Taylor & Hunt, P.A.

(57) ABSTRACT

According to one aspect, the disclosed subject matter describes herein a method that includes establishing a plurality of flow interfaces associated with an enterprise service in response to receiving an order request for the enterprise service and sending, for each of the plurality of flow interfaces, flow interface information that specifies parameters associated with the flow interface to a network routing element designated to transport the enterprise service. The method further includes configuring the flow interface on a media interface of the network routing element as specified by the parameters included in the flow interface information and implementing the enterprise service via the configured flow interface.

20 Claims, 5 Drawing Sheets

(56) References Cited

U.S. PATENT DOCUMENTS

| | | | |
|---|---|---|---|
| 7,864,763 | B2 | 1/2011 | Yi |
| 8,072,992 | B2 | 12/2011 | Deal et al. |
| 8,089,905 | B2 | 1/2012 | Umeshima |
| 8,233,479 | B2 | 7/2012 | Wijnands et al. |
| 8,868,745 | B1 | 10/2014 | Muley |
| 9,674,045 | B2 | 6/2017 | Latham et al. |
| 2005/0021742 | A1 | 1/2005 | Yemini et al. |
| 2009/0180493 | A1 | 7/2009 | Hirano et al. |
| 2009/0210523 | A1 | 8/2009 | Duggan |
| 2010/0228854 | A1 | 9/2010 | Morrison et al. |
| 2010/0271955 | A1* | 10/2010 | Atsumi ............... H04L 12/5693 370/241 |
| 2011/0254704 | A1 | 10/2011 | Fournier et al. |
| 2012/0297379 | A1* | 11/2012 | Anderson ........... G06F 9/45558 718/1 |
| 2013/0283175 | A1 | 10/2013 | Faridian et al. |
| 2015/0049641 | A1* | 2/2015 | Pugaczewski .......... H04L 45/02 370/254 |
| 2015/0117195 | A1* | 4/2015 | Toy ....................... H04L 47/263 370/232 |
| 2015/0156108 | A1* | 6/2015 | Shi ...................... H04L 12/4658 370/218 |
| 2016/0173340 | A1 | 6/2016 | Latham et al. |
| 2016/0173342 | A1 | 6/2016 | Latham et al. |

OTHER PUBLICATIONS

Commonly-assigned, co-pending U.S. Patent Application for "Methods, Systems, and Computer Readable Media for Modeling Packet Technology Services Using a Packet Virtual Network (PVN)," (Unpublished, filed Dec. 12, 2014).

"IEEE 802.1ad," http://en.wikipedia.org/wiki/IEEE_802.1ad, pp. 1-4 (Jul. 18, 2014, Downloaded from the Internet Dec. 12, 2014).

"Virtual private network," http://en.wikipedia.org/wiki/Virtual_private_network, pp. 1-6 (Dec. 3 , 2014, Downloaded from the Internet Dec. 11, 2014).

"Vision and Strategy Based on Network as a Service Principles," MEF TheThirdNetwork Agile, Assured, Orchestrated, http://www.metroethernetforum.org/Assets/Documents/MEF_Third_Network_Vision_FINAL.pdf, pp. 1-17 (Nov. 2014).

"MEF Technical Specification," MEF 12.2, Carrier Ethernet Network Architecture Framework Part 2: Ethernet Services Layer, http://www.metroethernetforum.org/Assets/Technical_Specifications/PDF/MEF12.2.pdf, pp. 1-60 (May 2014).

"MEF Technical Specification," MEF 10.3, Ethernet Services Attributes Phase 3, https://www.metroethernetforum.org/Assets/Technical_Specifications/PDF/MEF_10.3.pdf, pp. 1-113 (Oct. 2013).

"Ethernet Virtual Connections (EVCs)," Cisco IOS Software Configuration Guide, Release 12.2SY, Chapter 38, http://www.cisco.com/c/en/us/td/docs/switches/lan/catalyst6500/ios/12-2SY/configuration/guide/sy_swcg/ethernet_virtual_connection.pdf, pp. 38-1-38-14 (Sep. 28, 2013).

Oracle Communications Unified Inventory Management, Oracle Data Sheet, http://www.oracle.com/us/industries/communications/045545.pdf, pp. 1-5 (2012).

"MEF Technical Specification," MEF 10.2, Ethernet Services Attributes Phase 2, http://www.metroethernetforum.org/Assets/Technical_Specifications/PDF/MEF10.2.pdf, pp. 1-59 (Oct. 2009).

Appendix A, "Setting up, VLAN Translation," Cisco IP Solution Center L2VPN User Guide, 4.1 http://www.cisco.com/en/US/docs/net_mgmt/ip_solution_center/4.1/l2vpn /user/guide/vlantran.html, pp. 1-8, (2005).

"MEF Technical Specification," MEF 4, Metro Ethernet Network Architecture Framework—Part 1: Generic Framework, http://www.metroethernetforum.org/Assets/Technical_Specifications/PDF/MEF4.pdf, pp. 1-26 (May 2004).

Chapter 13, "Configuring VLANs," Catalyst 2950 Desktod Switch Software Configuration Guide, http://www.cisco.com/c/en/us/td/docs/switches/lan/catalyst2950/sotware/release/12-1_9_ea1/configuration/guide/scg/swvlan.html#wp1274639, pp. 1-38, (Apr. 2002).

Non-Final Office Action for U.S. Appl. No. 14/569,406, dated Jun. 27, 2016.

"Functional Design UIM Core-Packet Connectivity—Phase II InvRmiS0373," Communications Information Suite SR3, 4.3 Final Rev. 7, Oracle p. 1-141 (May 27, 2014).

O'Grady, "SR3 Packet Connectivity Overview," Oracle p. 1-35 (Sep. 11, 2013).

Notice of Allowance and Fee(s) Due for U.S. Appl. No. 14/569,406, dated Feb. 3, 2017.

Notice of Allowance and Fee(s) Due for U.S. Appl. No. 14/569,406, dated Dec. 7, 2016.

Non-Final Office Action for U.S. Appl. No. 14/569,591, dated Mar. 9, 2017.

Hashimoto et al., "A Study of User Interface of On-Demand Overlay Network for Clouds," 9th Asia-Pacific Symposium on Information and Telecommunication Technologies (APSITT), pp. 1-6 (2012).

\* cited by examiner

METHODS, SYSTEMS, AND COMPUTER READABLE MEDIA FOR CONFIGURING A FLOW INTERFACE ON A NETWORK ROUTING ELEMENT

CROSS-REFERENCE TO RELATED APPLICATIONS

This application relates to U.S. patent application Ser. No. (to be assigned), entitled METHODS, SYSTEMS, AND COMPUTER READABLE MEDIA FOR MODELING PACKET TECHNOLOGY SERVICES USING A PACKET VIRTUAL NETWORK (PVN), filed on an even date herewith, and U.S. patent application Ser. No. (to be assigned), entitled METHODS, SYSTEMS, AND COMPUTER READABLE MEDIA FOR CONFIGURING SERVICE NETWORKS, filed on an even date herewith. The disclosures of each of the related applications referenced herein are hereby incorporated by reference in their entireties.

TECHNICAL FIELD

The subject matter described herein relates to configuring media interfaces and delivering enterprise packet services to one or more customer service locations. More particularly, the subject matter described herein relates to systems, methods, and computer readable media for configuring a flow interface on a network routing element.

BACKGROUND

Packet services and carrier Ethernet services for providing enterprise services associated with voice, video, and/or data packets are experiencing widespread market adoption. "Packet services" generally refer to services provided over packet networks. "Carrier Ethernet services" refers to services provided by telecommunications network providers (carriers) using Ethernet technology in their networks. Carrier Ethernet services can thus be considered a subset of packet services.

With the increased popularity of packet service technology, bandwidth demands are growing, which in part is leading to increased demands for enterprise service automation. Carrier Ethernet services are also the foundation for new enterprise services, such as cloud data center services, Long-Term Evolution (LTE) mobile communications, and other packet technology services, which are also experiencing widespread market adoption.

In efforts to manage existing packet technology services, providers must rely on network engineers or administrators for providing custom designed solutions for service configuration and packet network connectivity. This requires extensive manual software design, labor intensive coding, and technology specific modeling prior to network activation. Such services are expensive to provide, time consuming, and slow to deploy.

Presently, there is no technology-independent service designs, configurations, or packet network connectivities that may be implemented within networks associated with various packet based domains. Notably, technology independent models are desired for supporting packet flow inspection, shaping, and configuration at any access point in a packet based network. Furthermore, systems and methods for visual design support and/or adequate modeling for complex multipoint-to-multipoint (MP2MP) services for all major packet based domains do not currently exist.

SUMMARY

Methods, systems, and computer readable media for configuring a flow interface on a network routing element are disclosed. According to one aspect, the subject matter described herein comprises a method that includes establishing a plurality of flow interfaces associated with an enterprise service in response to receiving an order request for the enterprise service and sending, for each of the plurality of flow interfaces, flow interface information that specifies parameters associated with the flow interface to a network routing element designated to transport the enterprise service. The method further includes configuring the flow interface on a media interface of the network routing element as specified by the parameters included in the flow interface information and implementing the enterprise service via the configured flow interface.

The subject matter described herein may be implemented in hardware, software, firmware, or any combination thereof. As such, the terms "function", "node" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for configuring a flow interface on a network routing elements. As used herein, a flow interface comprises a virtual construct that may be used within an abstract object model to efficiently organize both equipment and technology aspects associated with a network designated to transport an enterprise service. For example, a flow interface may comprise a type of sub-interface configured on a physical media interface of a network routing element (e.g., a network access point, a network logical device, etc.) that supports packet-based management tasks, such as packet inspection, traffic shaping, and packet route forwarding. In some embodiments, a collection of flow interfaces may serve as logical points used to establish enterprise service connectivities between network routing elements located in an underlying physical infrastructure. Notably, a flow interface (along with an associated flow interface configuration and flow identifier) provides a foundation for a technology independent model that supports the delivery and management of an enterprise packet service to one or more customer service locations. For example, flow interfaces may be used to facilitate the fulfillment and automation of various packet enterprise services including, but not limited to, carrier Ethernet, enterprise local area network (E-LAN), network function virtualization (NFV), long term evolution (LTE) backhaul, and software defined network (SDN) related services.

Figure 1:
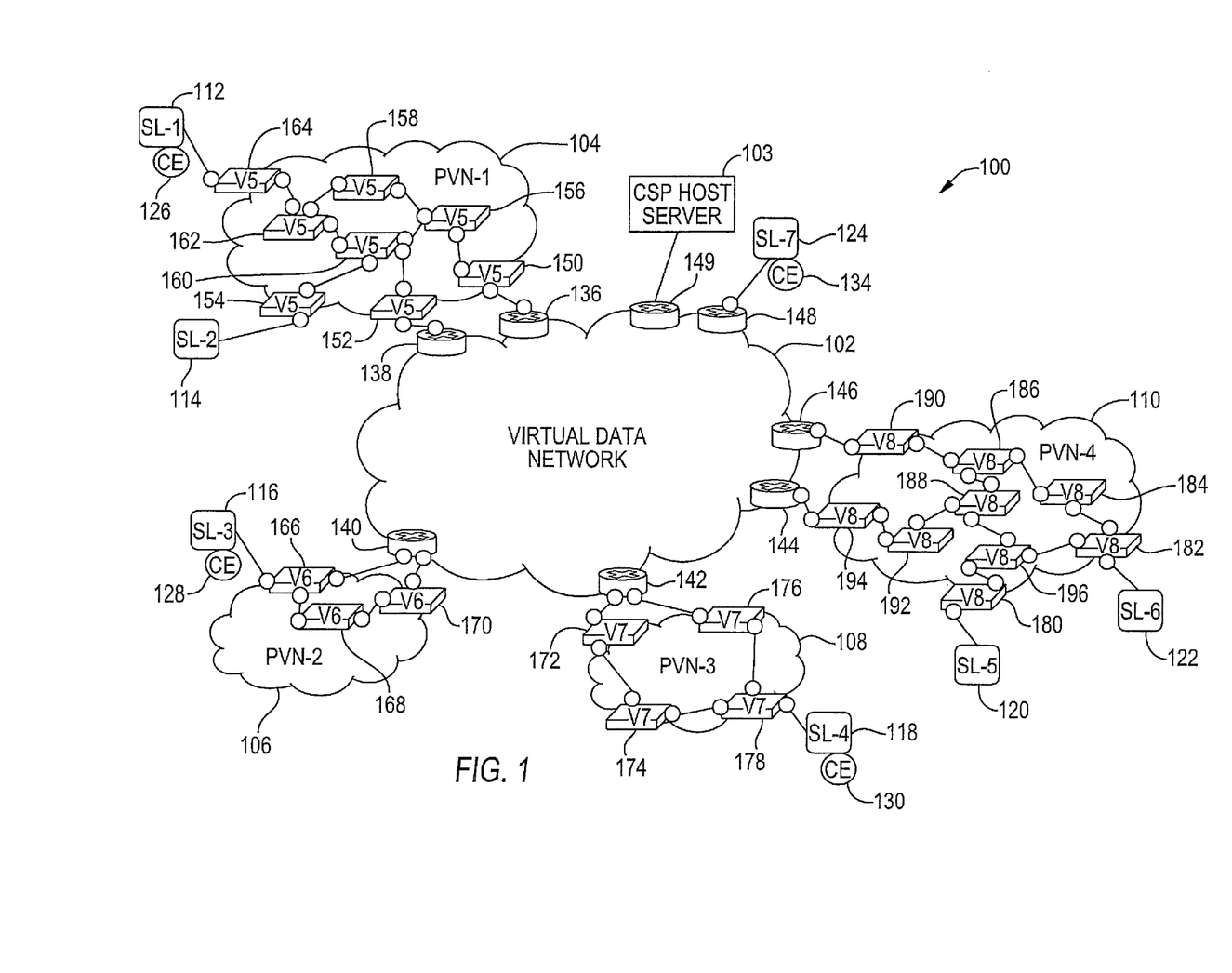
FIG. 1 is a block diagram illustrating a system for configuring flow interfaces on network routing elements according to an embodiment of the subject matter described herein.

FIG. 1 illustrates a service network 100 that may be utilized by a communications service provider (CSP) to deliver or transport a packet based enterprise service to one or more customer service locations. For example, network 100 may include a core virtual data network 102 that communicatively connects a plurality of private virtual networks (PVNs) 104-110 that are used by at least one CSP host server 103 to provide enterprise services to one or more of service locations 112-124. Although virtual data network 102 and PVNs 104-110 comprise virtual networks, networks 102-110 are connected and formed by an underlying infrastructure network that comprises physical network devices, such as routing elements 136-149 and switching elements 150-196. Specifically, virtual data network 102 may establish a plurality of connections with PVNs 104-100 via routing elements 136-148. Likewise, each of PVNs 104-110 may comprise switching elements that form one or more communications links between one or more routing elements and a customer service location. For example, a point to point enterprise service fulfilled via CSP host server 103 may be delivered to a managed customer equipment (CE) device 128 at service location 116 via routing element 140 and one or more of switching elements 166-170. Similarly, CSP host server 103 may be configured to deliver a multi-point to multipoint (MP2MP) enterprise service (e.g., E-LAN) to a plurality of customer service locations. As detailed below, host server 103 may configure flow interfaces on the media interfaces of network elements identified as being necessary to deliver either a point to point enterprise service or a multipoint to multipoint enterprise service.

Figure 2:
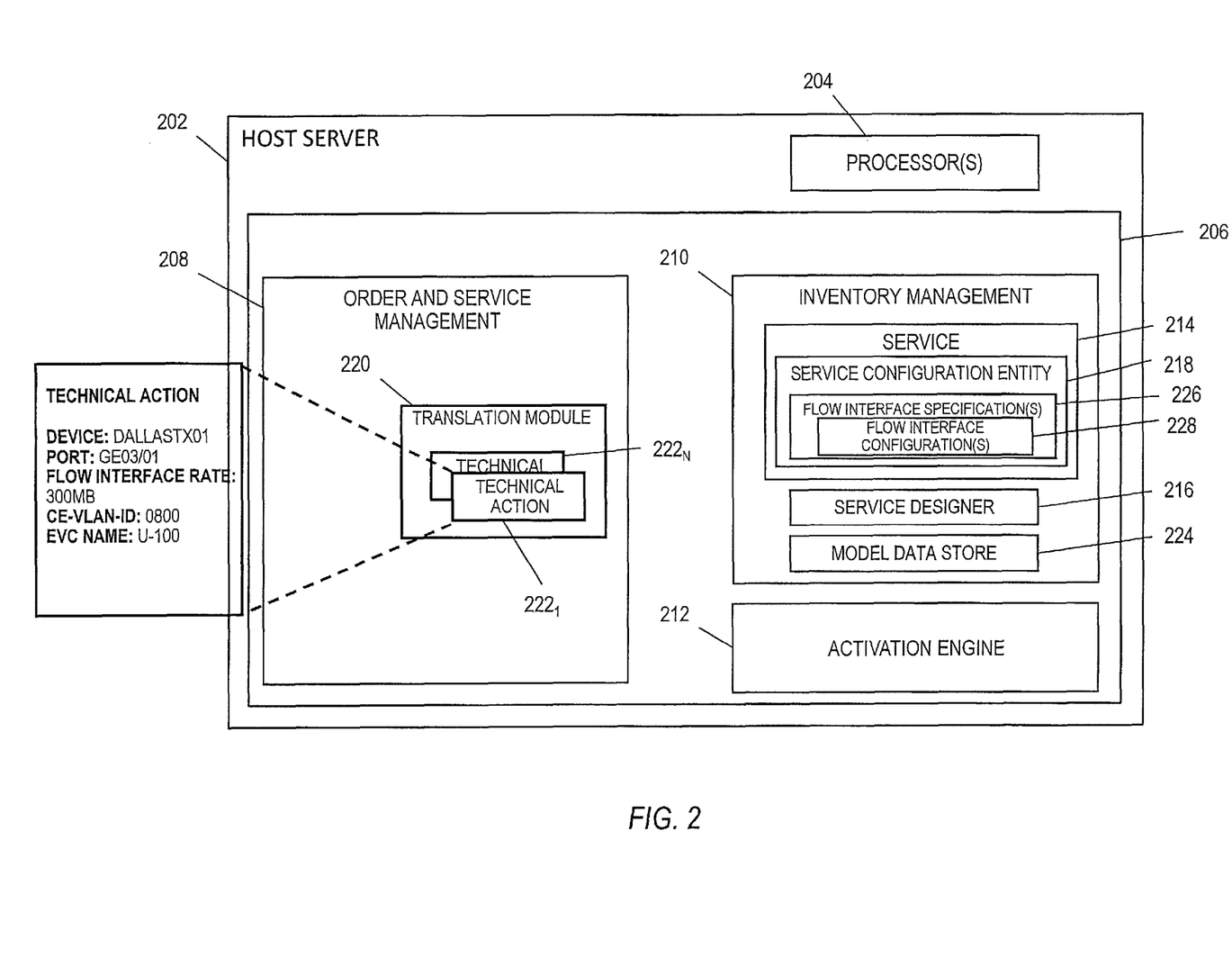
FIG. 2 is a block diagram illustrating an exemplary host server configured to configure flow interfaces according to an embodiment of the subject matter described herein.

FIG. 2 depicts an exemplary CSP host server 202 (i.e., an exemplary embodiment of CSP host server 103 shown in FIG. 1) that is configured to design and provision flow interfaces associated with an enterprise service deployment. In some embodiments, CSP host server 202 may comprise at least one processor 204 and a memory 206. In some embodiments, processor(s) 204 can comprise a microprocessor, central processing unit (CPU), or any other like hardware based processor unit. Memory 206, which can comprise random access memory (RAM), read only memory (ROM), optical read/write memory, cache memory, magnetic read/write memory, flash memory, or any other non-transitory computer readable medium, may be configured to store an order and service management (OSM) module 208, an inventory management (IM) module 210, and an activation engine (AE) module 212. Notably, processor 204 and memory 206 can be utilized by host server 202 to execute and manage the operation of modules 208-212. It should be noted that the CSP host server 202 (and/or CSP host server 103 shown in FIG. 1) and its components and functionality described herein can constitute a special purpose computing device that improves the technological field of enterprise service delivery by configuring logical interfaces on physical network elements that can be used support various packet-based management tasks (e.g., such as packet inspection, traffic shaping, and packet route forwarding, etc.) associated with enterprise service connectivities. In some embodiments, Order and Service Management (OSM) module 208 may be configured to send a message (e.g., a capture order message) to inventory management module 210 that indicates that a new enterprise service order has been received from a customer entity. In response to receiving the message, a service designer module 216 in IM module 210 may create a service 214 and associated service configuration 218 based on the service specifications contained in the capture order message. For example, IM module 210 may initially access a model data store 224 (e.g., a database) to obtain network infrastructure information that can be employed to implement and deliver the requested service. In some embodiments, model data store 224 comprise a relational database that records and maintains location/address information associated with all of the nodes, routing elements, equipment, and connections existing in the underlying physical infrastructure. Using model data store 224, service designer module 216 is able to ascertain the network components needed to implement the requested enterprise service. Namely, service designer module 216 uses the location and/or address information for each network node as a component of a designed service 214 and associated service configuration 218. For example, designed service 214 comprises information that indicates the type of enterprise service ordered (e.g., E-LAN service) and service configuration 218 contains data (e.g., service location/address information, bandwidth profile information (e.g., 300 Mb/sec), and the type of connectivity (e.g., UNI) existing between the target service location and a supporting PVN), which can be used to implement the requested service. More specifically, service configuration entity 218 associated with the enterprise service designed by service designer module 216 may include at a plurality of flow interface specifications 226, each of which defines a virtual flow interface (described in detail below) that is associated with a physical network component residing in the physical network infrastructure. Moreover, each flow interface specification 226 contains a corresponding flow interface configuration data 228. Notably, flow interface configuration data 228 may represent a specification that instantiates one or more flow interface configuration entities. Although not depicted in FIG. 2, flow interface specification entities (e.g., flow interface specifications 226) and flow interface configuration specification entities (e.g., flow interface configurations 228) may reside in a packet virtual network configuration, which in turn resides in a packet virtual network entity, which in turn is contained in service configuration entity 218. In some embodiments, the packet virtual network entity and the packet virtual network configuration are both entities that are instantiated using specifications supported by inventory management module 210.

In some embodiments, a particular flow interface may be defined by parameters (e.g., flow interface information) included in flow interface configuration data 228. For example, flow interface configuration data 228 may include a software based construct or object that is configured to store a collection of parameters (or facts) about a flow interface. Exemplary parameters include data such as current version number, address/port information of the network node supporting the flow interface, and the flow interface bit rate. In some embodiments, a flow interface configuration may be used to determine the difference (e.g., version differences) between two versions of a set of configuration parameters for a particular flow interface supported by a network element. The flow interface configuration may be used calculate change configuration actions in order to manage a complex enterprise service change at a particular ingress/egress point (e.g., an access point/network element) in the packet network. Similarly, in some embodiments flow interface information (e.g., C-Tag/CE-VLAN-ID, S-Tag/SP-VLAN-ID, P-Tag, etc.) stored as flow interface configuration data 228 may change. For example, over a period of time, an S-Tag may change from identifying an SP-VLAN-ID #101 to an SP-VLAN-ID #201. In such instances, flow interface configuration data 228 may utilize the configuration to keep a record of history. For instance, a first version of a flow interface configuration (i.e., version 1) may record a flow identifier to be "SP-VLAN-ID #101" (as indicated above) with an associated effective "In Service" date of Jan. 15, 2014. Later on Jan. 15, 2014, the status of the version 1 flow interface configuration may be updated to a "Completed" status. Subsequently on Jun. 15, 2014, it is determined that "SP-VLAN-ID #101" needs to be changed to "SP-VLAN-ID #201". Thus, a second version of the flow interface configuration (i.e., version 2) is created with an "In Progress" status and a designated start data of Jun. 15, 2014. Likewise, the first version of the flow interface configuration retains its "Completed" status. Once all of the engineering changes are completed, the second version of the flow interface configuration is validated and updated to a "Completed" status while the first version of the flow interface configuration is update with an end date of Jun. 15, 2014 and a recorded effective period of Jan. 15, 2014-Jun. 15, 2014. Notably, any individual interface property within a flow interface configuration that affects the enterprise service may be changed and/or managed in this manner.

Upon completion of the service design process, service designer module 216 may forward service design information associated with service 214 to OSM module 208, which subsequently translates the received design information into a plurality of technical actions. Notably, OSM module 208 may include a translation module 220 (e.g., a technical action process) that is configured to utilize the design information to generate a number of technical actions 222, each of which includes information associated with a respective flow interface. For example, technical action $222_1$ depicted in FIG. 2 specifies parameters of a flow interface that includes information such as a particular port (e.g., GE03/01) of a particular network device (e.g., DAL-LASTX01) in a particular PVN network (EVC name: U-100). Moreover, technical action $222_1$ further includes a predefined flow interface bit rate (e.g., 300 Mb/s) and a flow identifier (e.g., CE-VLAN-ID: 0800) associated with the specified flow interface. Notably, each technical action 222 that is generated corresponds to a single flow interface that may be used (e.g., collectively with other flow interfaces) to deliver the requested enterprise service to a customer entity. In some embodiments, translation module 220 may subsequently use the generated technical actions 222 to build corresponding activation commands, which may be compatible and/or recognized by the target network routing elements. The generated activation commands are ultimately forwarded from OSM module 208 to AE module 212, which may be configured to send the activation commands to the appropriate network routing elements for execution.

Returning to FIG. 1, a requested enterprise service may be fulfilled by host server 103 to multiple service locations in some embodiments. Returning to FIG. 1 for example, host server 103 may receive an enterprise service (e.g., an E-LAN service) order from a customer entity that requests a service for delivery at service locations 112-124. In order to fulfill the enterprise service requested by the customer entity, several infrastructure networks may be utilized by host server 103 for service transport and delivery. Specifically, service locations 112 and 114 are supported by the specific components of PVN 106 and service location 116 is supported using specific components from PVN 106. Similarly, service location 118 is supported using specific network elements in PVN 108 and service locations 120 and 122 are supported using network elements in PVN 110. In addition, service location 124 may be supported directly from virtual data network via routing element 148 (i.e., service location 124 does not directly utilize an Ethernet infrastructure).

Specifically, the network elements (e.g., switching elements 150-196) in the underlying infrastructure network are utilized to establish PVNs 104-110. Notably, FIG. 1 depicts the individual media interfaces (e.g., the 'white dots' on network routing elements 136-196) and the communications links (e.g., the lines connecting the flow interfaces) used in each PVN to implement/transport the enterprise service. Moreover, FIG. 1 illustrates the flow identifiers (described in detail below) associated with each of the switching elements in the PVNs. For example, each switching elements 150-164 in PVN 104 have a common flow identifier that may be used to transport the enterprise service. In this scenario, each of switching elements 150-164 is designated with a VLAN identifier of "V5". Although the example in FIG. 1 depicts that each switching element has a common flow identifier, there may be other embodiments in which one or more switching elements 150-164 have different flow identifiers.

As used herein, a flow identifier is a model entity or an abstract representation of a parameter (e.g., a VLAN identifier) that is used to support names or tags that are attached to enterprise service flows in order to ensure that correct packet forwarding occurs irrespective to the technologies used to implement the enterprise service. For example, the flow identifier may traverse through a PVN as a tag to identify the enterprise service being delivered. In some embodiments, a flow identifier can be customized by the communications service provider (CSP) for the delivery of the enterprise service. Although the description herein indicates that the flow identifier is a VLAN identifier, other identifiers may be utilized without departing from the scope of the disclosed subject matter. For example, the flow identifier may comprise a customer virtual local area network (VLAN) identifier (C-VLANID), service VLAN identifier (S-VLANID), a carrier Ethernet VLAN identifier (CE-VLANID) (A.K.A. customer tag: C-Tag), a service provider VLAN identifier (SP-VLANID) (A.K.A. service tag: S-Tag). Flow identifiers may also differ based on the underlying networking protocol used. For example, VPI or VCI may be utilized in ATM networks and VPLS identifier may be utilized in MPLS networks.

In some embodiments, flow identifiers may be managed by the CSP host server and are created by inventory management module 210. The flow identifiers may be subsequently grouped into domains and resource pools (e.g., a type of inventory group) from which the flow identifiers can be selected for assignment to PVNs. In some embodiments, the flow identifiers are included as a portion of the flow interface configuration data that is provided by IMM 210 to OSM module 208. This approach allows for flexibility and customization of flow identifiers since both VLAN identifiers and flow identifiers for other packet technologies (such as VPI, VCI, or DLCI) can be supported. In other embodiments, the flow identifiers may be managed by the customer entity (or some other service provider) and are received as part of a service order and referenced with a service location. In other embodiments, flow identifiers may be manually selected in a PVN from an appropriate network address domain by a network engineer or system administrator. The flow identifiers may then be assigned to the entire PVN or to an individual flow interface.

Figure 3:
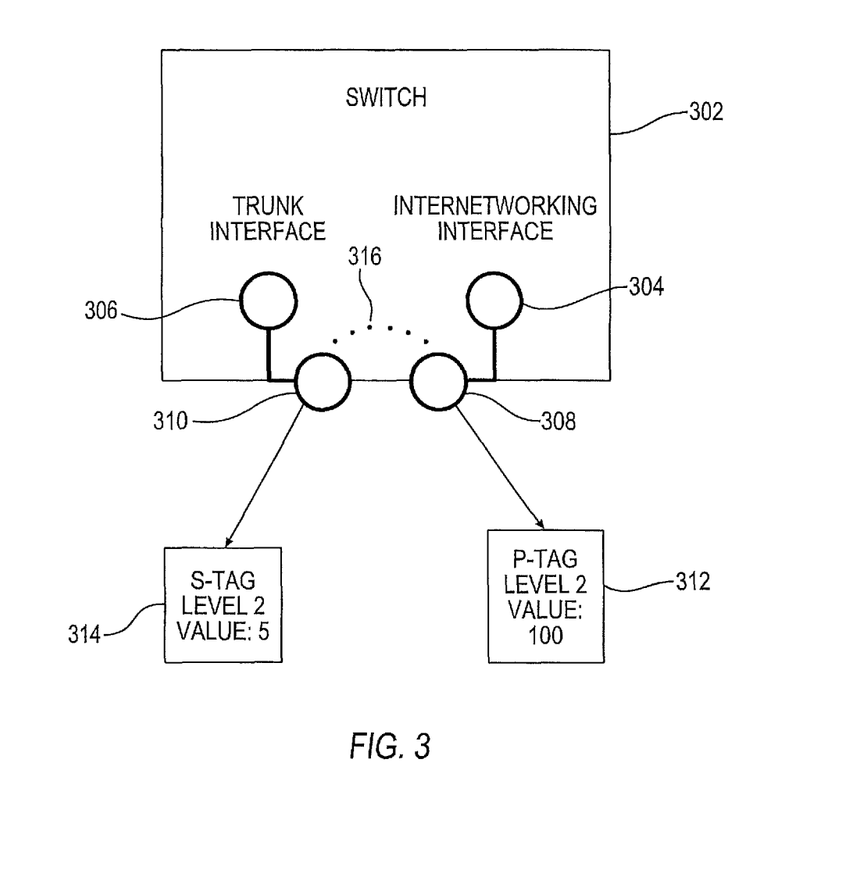
FIG. 3 is a block diagram illustrating an exemplary network routing element configured to utilize flow interfaces according to an embodiment of the subject matter described herein.

As indicated above, a flow interface includes a logical portioning or partitioning of a media interface to support a controlled flow (e.g., bit rate) of an enterprise service being delivered to a customer service location. In some embodiments, the flow interface may constitute a virtual entity that is extended from a network device's media interface for use as a sub-interface to track and/or manage flow identifiers (e.g., VLAN identifiers) mapped to devices residing in the underlying physical infrastructure. Notably, a flow interface is associated with (e.g., mapped to) a port or media interface of a physical network device (e.g., a router, switch, hub, etc.) through which packet traffic flows. As an example, FIG. 3 depicts a logical representation of an exemplary switching element 302 that is configured to utilize flow interfaces according to an embodiment of the subject matter described herein. In particular, switching element 302 may include a plurality of media interfaces, such as trunk interface 306 and internetworking interface 304, which are configured to receive and send packet traffic communications via an established service connectivity. Each of trunk interface 306 and internetworking interface 304 may be associated with an underlying 'media' device interface (e.g., a physical port) that is adapted to receive the packet traffic communications at the physical layer. Notably, each of interfaces 304-306 may be respectively logically partitioned by the CSP to include one or more flow interfaces associated with a defined bit rate. As shown in FIG. 3, a flow interface 310 may be configured on trunk interface 306 and flow interface 308 may be configured on internetworking interface 304. Each of flow interfaces 308-310 may be designed and generated by a CSP host server (see FIG. 2), which in turn systematically provisions the flow interfaces to receiving network elements. In some embodiments, a CSP host server (not shown in FIG. 3) may send activation commands, which contain flow interface information (or a flow interface specification), to network elements designated for fulfilling the requested enterprise service. Upon receiving an activation command including flow interface information from a CSP host server, switching element 302 may configure a media interface (e.g., one of interface 304-306 as specified in the activation command) in accordance to the contained flow interface information. For example, the received flow interface information may include a port identifier, a flow interface bit rate, and a flow identifier (as illustrated by flow identifiers 312-314 in FIG. 3). Using the flow interface information, switching element 302 may configure a flow interface that is capable of establishing a service connectivity at the specified bit rate on a media interface associated with the physical port identifier. As additional flow interfaces are configured on switching element 302, two or more flow interfaces may be logically linked together to form a flow cross-connection (e.g., cross-connect 316) that serves to implement the enterprise service. After being established, a flow interface may be utilized to track flow identifiers (e.g., VLAN identifiers) traversing through the packet virtual network. For example, the flow interface information may be tracked on the flow interface entity and flow interface configuration items. The participation of the flow interface in a packet virtual network may be tracked on the packet virtual network and the packet virtual network configuration. The participation of the packet virtual network in a service network may be tracked on the service network configuration.

FIG. 3 further depicts each of flow interfaces 308-310 respectively associated with flow identifier objects 312-314. Although depicted in FIG. 3, flow identifiers 312-314 are actually stored as parameters in a flow interface configuration (E.g., flow configuration data 228 in FIG. 2). For example, each of flow identifiers 312-314 includes information indicating the name/type of tag (e.g., S-Tag, P-Tag, etc.) and an alphanumeric identifier associated with the PVN being utilized. As indicated above, the flow identifier may comprise any number of identifier types, such a VLAN identifier for Ethernet networks and a VPI or a VCI for an ATM network. For example, flow identifier 1314 indicates an S-Tag type identifier and identifies flow interface 310 as part of a VLAN identified as "5" (i.e., Value: 5). Similarly, flow identifier 312 indicates a P-Tag type identifier and identifies flow interface 308 as part of a VLAN identified as "100" (i.e., Value: 100). In this example, a P-Tag (Provider Tag—not an industry standard) represents a Communications Service Provider (CSP) defined customization of a VLAN ID provided by another service provider for tracking the service through the other provider's network.

Figure 4:
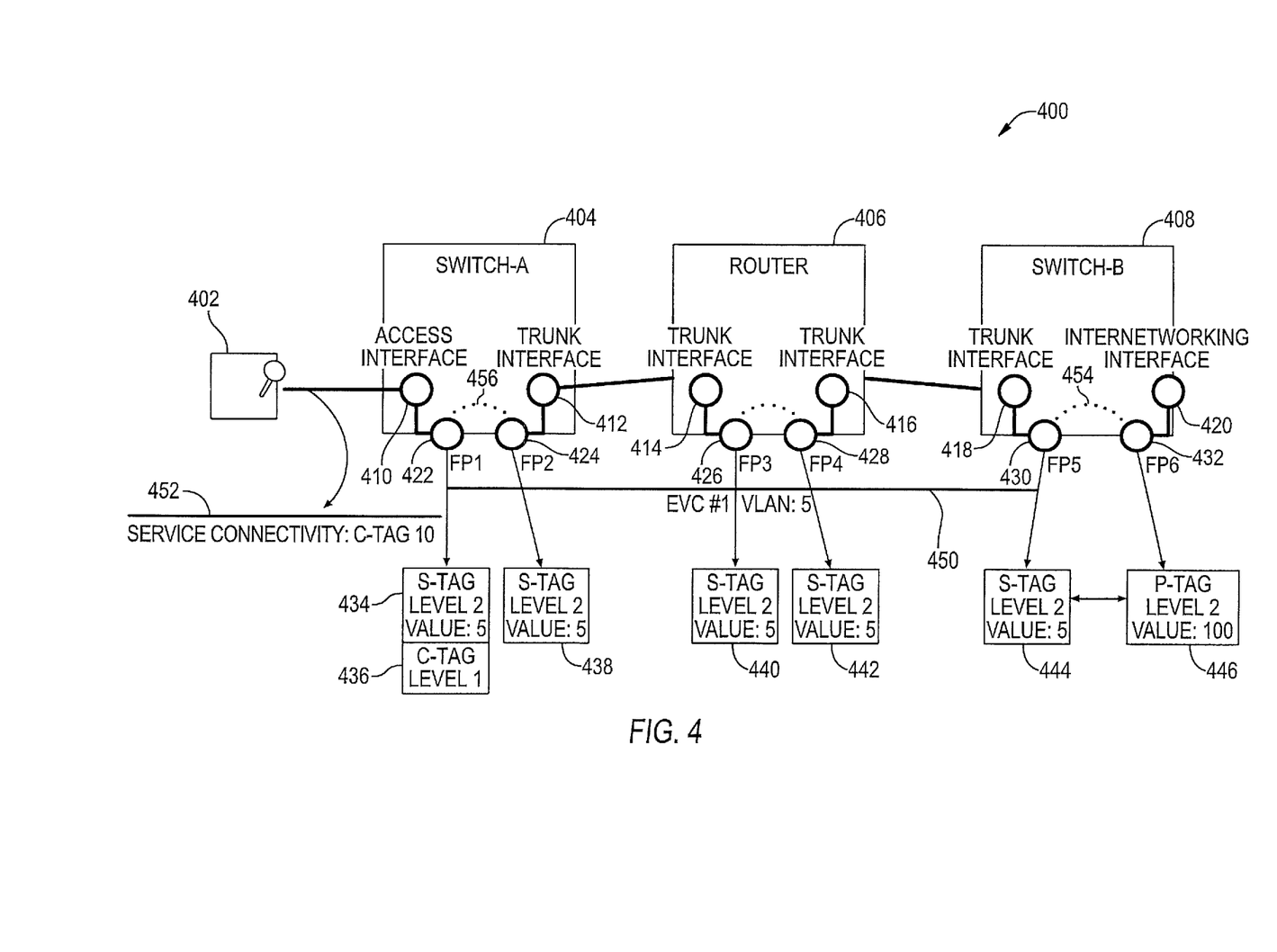
FIG. 4 is a diagram illustrating a service connectivity leg established via flow interfaces according to an embodiment of the subject matter described herein.

FIG. 4 illustrates an example of utilizing flow interfaces to establish a connectivity used to deliver an enterprise service. Packet enterprise services are often multipoint services, such that an enterprise service may connect more than two customer service locations together. Notably, FIG. 4 depicts a single service connectivity "leg" to one of the service locations in a multipoint to multipoint enterprise service.

In some embodiments, system 400 includes a plurality of network routing elements 404-408 that are communicatively connected and are configured to facilitate the delivery of a service supported by the CSP to customer service location 402. Although only a single service location is shown in FIG. 4, multiple service locations may be serviced in a like manner without departing from the scope of the disclosed subject matter. As shown in FIG. 4, switch 404 is communicatively connected to customer service location 402 via a service connectivity 452. Notably, service location 402 and switch 404 are logically connected via a flow interface 422 that corresponds to access interface 410. For example, flow interface 422 includes a flow identifier that comprises an S-Tag 434, which indicates a VLAN identifier value equal to 5. Likewise, each of flow identifiers 438-444 comprises an S-Tag that indicates a VLAN identifier value equal to 5. Notably, a plurality of flow interfaces associated with a common flow identifier (e.g., VLANID 5) enables a service connectivity to be established (e.g., service connectivity 450). As shown in FIG. 4, flow interface 422 functions to deliver the enterprise service to service location 402 via the aforementioned established service connectivity 452.

In some scenarios, a VLAN identifier translation process is needed to modify incoming packet traffic with a new VLAN identifier. For example, VLAN identifier translation constitutes a function conducted in Ethernet switches that enables a flow identifier in a received packet to be replaced (i.e., translated) with a new VLAN identifier. In some embodiments, two "trunk" flow interfaces provided by a switch can modify a VLAN identifier associated with the hosting network routing element. For example in FIG. 4, flow interface 432 is associated with a VLAN identifier 446 that comprises a P-Tag that specifies a VLAN value equal to 100. However, in order for switching element 408 to implement the requested enterprise service, flow interface 430 needs to be able to support and carry the same amount of packet traffic, but via a different VLAN (e.g., a VLAN comprising elements 404-408). Thus, flow interface 430 is configured with a flow identifier 444 that allows for the communication of traffic from a VLAN #100 to flow interface 430 over an established flow interface cross connection 450. Thus, packet traffic may be received on media interface 420 as VLAN 100 packet traffic and directed to media interface 418 as VLAN 5 packet traffic. A similar cross connect translation may also be performed at cross connection 456 in switch 404.

Figure 5:
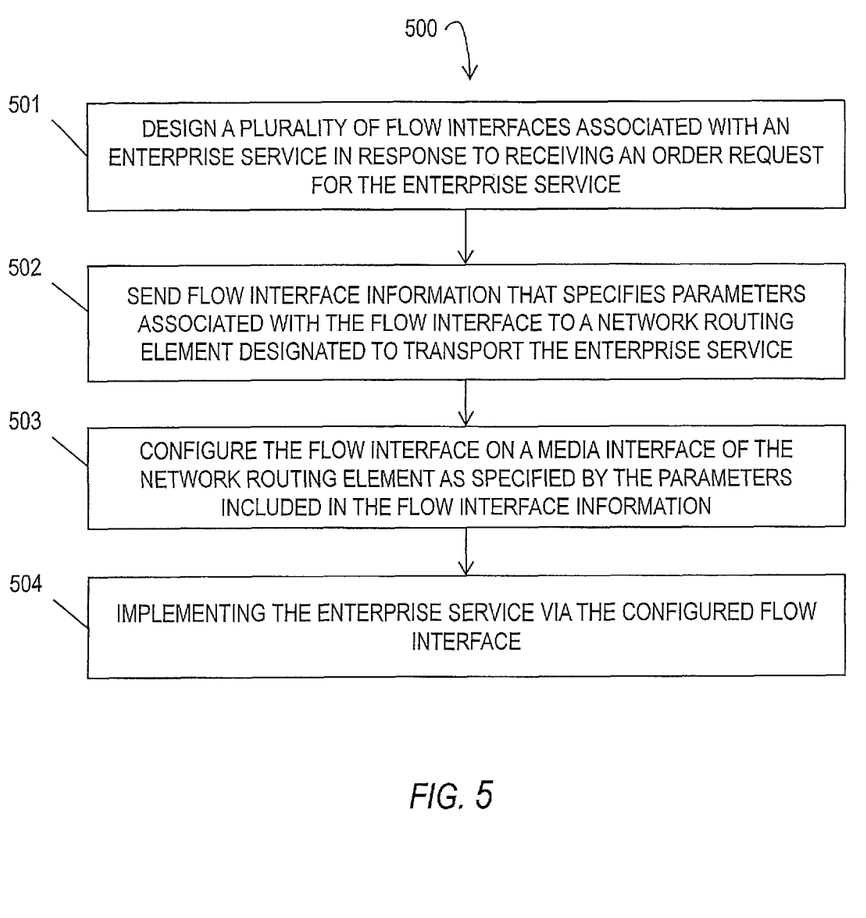
FIG. 5 is a flow chart illustrating an exemplary process for configuring a flow interface on a network routing element according to an embodiment of the subject matter described herein.

FIG. 5 is a diagram illustrating an exemplary process for configuring a flow interface on a network routing element according to an embodiment of the subject matter described herein. In some embodiments, exemplary process 500, or portions thereof, may be performed by or a CSP host server (e.g., host server 103 in FIG. 1) and/or another node or module.

In step 501 a plurality of flow interfaces associated with an enterprise service is established in response to receiving an order request for the enterprise service. In some embodiments, a CSP host server receives an order request message indicating that a customer entity is requesting a new enterprise service (e.g., E-LAN service). In response, CSP host server may initiate the design of the enterprise service by constructing flow interface information that defines the flow interfaces used to ultimately deliver the enterprise service. For example, the flow interface information may include a designated network element, a media interface or port on the designated network element, a flow interface rate that specifies the bit rate capacity of the flow interface, and a flow identifier.

In step 502, the flow interface information is sent to a specified network routing element. In some embodiments, CSP host server may identify each of the network routing elements that are required to deliver the enterprise service to one or more service locations. Moreover, the CSP host server may translate the flow interface information into activation commands, each of which is subsequently forwarded to one of the identified/designated network elements.

In step 503, the flow interface is configured on a media interface of the network routing element as specified by the parameters included in the flow interface information. In some embodiments, a recipient network routing element utilizes the received flow interface information to logically partition a portion of a media interface or port (specified in the flow interface information) in order to configure a flow interface that is adapted to transport the enterprise service at the specified flow interface bit rate.

In step 504, the enterprise service is implemented via the configured flow interface. In some embodiments, the CSP may deliver the requested enterprise service to the customer through the flow interfaces configured on the media interfaces in accordance to the established flow interface bit rate. Notably, the enterprise service may be fulfilled via the plurality of flow interfaces designed by the CSP host server and ultimately configured on the media interfaces of the identified network routing elements. In some embodiments, the CSP may further utilize the flow interfaces to manage and/or modify the fulfilled enterprise service. More specifically, the flow interface and associated components can be used as resource building blocks for the automated provisioning, upgrading, downgrading, or ceasing of packet enterprise services provided to one or more customer service locations. As an example, suppose on Jun. 15, 2014, the customer requests the bit rate associated with the enterprise service to increase from 10 Mb/s to 50 Mb/s. In response, the flow interface may be configured to provide the increased bandwidth. Notably, when the configuration to the flow interface is completed, the automated process is repeated. For example, the automation process may compare the two configuration versions (e.g., an original flow interface configuration (e.g., version 1) specifying a bit rate of 10 Mb/s and a new flow configuration that specifies a new bit rate of 50 Mb/s in order to determine the appropriate technical action(s) to perform (e.g., increase the bit rate flow from 10 Mb/s to 50 Mb/s). In another example, suppose that a network element identified as SL7 is disconnected and/or removed from supporting an enterprise service on Jun. 28, 2014. Upon completing the disconnection of SL7 from the enterprise service, the requisite commands are sent by the CSP host to the network element device (i.e., SL7) to no longer support the communication of packet traffic from that location.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for configuring a flow interface on a network routing element, the method comprising:
    establishing, by a customer service provider (CSP) host server, a plurality of flow interfaces associated with an enterprise service in response to receiving, from customer equipment at a service location, an order request for the enterprise service by generating flow interface information parameters that define the plurality of flow interfaces and a corresponding flow interface bit rate for each of the plurality of flow interfaces that is used to implement the enterprise service and provide the enterprise service to the customer equipment;
    sending, by the CSP host server, the flow interface information parameters defining the plurality of flow interfaces to a plurality of network routing elements designated to transport the enterprise service, wherein at least a set of two of the plurality of flow interfaces form a logical cross-connect connecting the two of the plurality of flow interfaces in at least one of the plurality of network elements and carry packet traffic at a same flow interface bit rate, the logical cross-connect requires a flow identifier translation, by the at least one of the plurality of network elements, between two different virtual local area networks having different flow identifiers in order to implement the enterprise service, wherein another set of two of the plurality of flow interfaces are within one of the different virtual local area networks and have same flow identifiers;
    configuring the flow interfaces on physical media interfaces of the plurality of network routing elements as specified by the flow interface information parameters, wherein each of the physical media interfaces at the plurality of network routing elements is logically portioned in accordance to the flow interface information parameters generated by the CSP host server to include one or more of the flow interfaces, wherein each of the flow interfaces communicates at the corresponding flow interface bit rate that is defined by the CSP host server; and implementing the enterprise service via the configured flow interfaces.

2. The method of claim 1 wherein implementing the enterprise service includes at least one of: provisioning the enterprise service, upgrading the enterprise service, downgrading the enterprise service, and ceasing the enterprise service.

3. The method of claim 1 wherein the enterprise service includes a carrier Ethernet service, a long term evolution (LTE) backhaul, a software defined network (SDN) service, or a network function virtualization (NFV) service.

4. The method of claim 1 wherein the enterprise service comprises a service to be provisioned over a plurality of service locations.

5. The method of claim 1 wherein the parameters of the flow interface information include at least one of: a media interface identifier, a flow interface bit rate, and a flow identifier.

6. The method of claim 5 wherein the flow identifier includes at least one of a virtual local area network (VLAN) identifier, a carrier Ethernet CE-VLANID, a customer tag (C-Tag), a service provider SP-VLANID, and a service tag (S-Tag).

7. The method of claim 1 wherein two or more flow interfaces in each of the network routing elements are coupled via a flow cross connect that serves to establish a connectivity within the network routing element.

8. The method of claim 1 wherein configuring the flow interface on the media interface includes restricting packet message traffic to the flow interface bit rate.

9. A system for configuring a flow interface on a network routing element, the system comprising: a customer service provider (CSP) host server comprising at least one processor and memory configured to execute:

an inventory management (IM) module configured, when executed by the at least one processor of the CSP host server, to establish a plurality of flow interfaces associated with an enterprise service in response to receiving, from customer equipment at a service location, an order request for the enterprise service by generating a corresponding flow interface information parameters that define the plurality of flow interfaces and a flow interface bit rate for each of the plurality of flow interfaces that is used to implement the enterprise service and provide the enterprise service to the customer equipment;

an order and service management (OSM) module configured, when executed by the at least one processor of the host server, to send the flow interface information parameters defining the plurality of flow interfaces to a plurality of network routing elements designated to transport the enterprise service, wherein at least a set of two of the plurality of flow interfaces form a logical cross-connect connecting the two of the plurality of flow interfaces in at least one of the plurality of network elements and carry packet traffic at a same flow interface bit rate, the logical cross-connect requires a flow identifier translation, by the at least one of the plurality of network elements, between two different virtual local area networks having different flow identifiers in order to implement the enterprise service, wherein another set of two of the plurality of flow interfaces are within one of the different virtual local area networks and have same flow identifiers, wherein the flow interfaces are configured on physical media interfaces of the plurality of network routing elements as specified by the parameters included in the flow interface information, wherein each of the physical media interfaces at the plurality of network routing elements is logically portioned in accordance to the flow interface information parameters generated by the CSP host server to include one or more of the flow interfaces, wherein each of the flow interfaces communicates at the corresponding flow interface bit rate defined by the CSP host server, and implementing the enterprise service via the configured flow interface.

10. The system of claim 9 wherein the OSM module is further configured to implementing the enterprise service includes at least one of:

provisioning the enterprise service, upgrading the enterprise service, downgrading the enterprise service, and ceasing the enterprise service.

11. The system of claim 9 wherein the enterprise service includes a carrier Ethernet service, a long term evolution (LTE) backhaul, a software defined network (SDN) service, or a network function virtualization (NFV) service.

12. The system of claim 9 wherein the enterprise service comprises a service to be provisioned over a plurality of service locations.

13. The system of claim 9 wherein the parameters of the flow interface information include at least one of: a media interface identifier, a flow interface bit rate, and a flow identifier.

14. The system of claim 13 wherein the flow identifier includes at least one of a virtual local area network (VLAN) identifier, a carrier Ethernet CE-VLANID, a customer tag (C-Tag), a service provider SP-VLANID, and a service tag (S-Tag).

15. The system of claim 9 wherein two or more flow interfaces in each of the network routing elements are coupled via a flow cross connect that serves to establish a connectivity within the network routing element.

16. The system of claim 9 wherein the OSM module is further configured to restrict packet message traffic to the flow interface bit rate.

17. A non-transitory computer readable medium comprising computer executable instructions embodied in the computer readable medium that when executed by a processor of a computer perform a method for configuring a flow interface on a network routing element, the method comprising:

establishing, by a customer service provider (CSP) host server, a plurality of flow interfaces associated with an enterprise service in response to receiving, from customer equipment at a service location, an order request for the enterprise service by generating flow interface information parameters that define the plurality of flow interfaces and a corresponding flow interface bit rate for each of the plurality of flow interfaces that is used to implement the enterprise service and provide the enterprise service to the customer equipment;

sending, by the CSP host server, the flow interface information parameters defining the plurality of flow interfaces to a plurality of network routing elements designated to transport the enterprise service, wherein at least a set of two of the plurality of flow interfaces form a logical cross-connect connecting the two of the plurality of flow interfaces in at least one of the plurality of network elements and carry packet traffic at a same flow interface bit rate, the logical cross-connect requires a flow identifier translation, by the at least one of the plurality of network elements, between two different virtual local area networks having different flow identifiers in order to implement the enterprise service, wherein another set of two of the plurality of flow interfaces are within one of the different virtual local area networks and have same flow identifiers;

configuring the flow interfaces on physical media interfaces of the plurality of network routing elements as specified by the flow interface information parameters, wherein each of the physical media interfaces at the plurality of network routing elements is logically portioned in accordance to the flow interface information parameters generated by the CSP host server to include one or more of the flow interfaces, wherein each of the flow interfaces communicates at the corresponding flow interface bit rate that is defined by the CSP host server; and implementing the enterprise service via the configured flow interfaces.

18. The computer readable medium of claim 16 wherein implementing the enterprise service includes at least one of; provisioning the enterprise service, upgrading the enterprise service, downgrading the enterprise service, and ceasing the enterprise service.

19. The computer readable medium of claim 16 wherein the enterprise service includes a carrier Ethernet service, a long term evolution (LTE) backhaul, a software defined network (SDN) service, or a network function virtualization (NEV) service.

20. The computer readable medium of claim 16 wherein the enterprise service comprises a service to be provisioned over a plurality of service locations.

* * * * *

UNITED STATES PATENT AND TRADEMARK OFFICE
CERTIFICATE OF CORRECTION

PATENT NO. : 9,866,408 B2  
APPLICATION NO. : 14/569589  
DATED : January 9, 2018  
INVENTOR(S) : Latham et al.

It is certified that error appears in the above-identified patent and that said Letters Patent is hereby corrected as shown below:

On the Title Page

On page 2, Column 2, item [56], under Other Publications, Line 15, delete "up," and insert -- up --, therefor.

On page 2, Column 2, item [56], under Other Publications, Line 23, delete "Desktod" and insert -- Desktop --, therefor.

In the Specification

Column 8, Line 23, delete "1314" and insert -- 314 --, therefor.

Column 9, Line 15, delete "450." and insert -- 454. --, therefor.

In the Claims

Column 14, Line 4, Claim 18, delete "of;" and insert -- of: --, therefor.

Column 14, Line 13, Claim 19, delete "(NEV)" and insert -- (NFV) --, therefor.

Signed and Sealed this  
Tenth Day of July, 2018

Andrei Iancu  
*Director of the United States Patent and Trademark Office*